(12) United States Patent
Charzat

(10) Patent No.: US 6,464,876 B1
(45) Date of Patent: Oct. 15, 2002

(54) PROCESS AND APPARATUS FOR A MIXTURE RESOLUTION

(75) Inventor: Claude Charzat, Lyons (FR)

(73) Assignee: Institute Francais du Petrole, Rueill Malmaison (FR)

( * ) Notice: Subject to any disclaimer, the term of this patent is extended or adjusted under 35 U.S.C. 154(b) by 0 days.

(21) Appl. No.: 09/402,691

(22) PCT Filed: Apr. 7, 1997

(86) PCT No.: PCT/FR97/00620

§ 371 (c)(1),
(2), (4) Date: Nov. 22, 1999

(87) PCT Pub. No.: WO98/45015

PCT Pub. Date: Oct. 15, 1998

(51) Int. Cl.[7] .......................... B01D 61/00; B01D 59/32; B01D 53/78
(52) U.S. Cl. ....................... 210/634; 210/652; 210/651; 210/767; 95/45
(58) Field of Search ................................ 210/767, 295, 210/299, 300, 301, 320, 634, 651, 652, 521, 522; 95/45

(56) References Cited

U.S. PATENT DOCUMENTS

| | | | |
|---|---|---|---|
| 2,609,277 A | | 9/1952 | McNamara |
| 3,032,403 A | * | 5/1962 | Kohl |
| 4,026,791 A | * | 5/1977 | Wallace |
| 4,133,714 A | | 1/1979 | Vorobiev et al. |
| 5,393,429 A | * | 2/1995 | Nakayama et al. |
| 5,431,023 A | * | 7/1995 | Howard et al. |
| 5,443,724 A | * | 8/1995 | Williamson et al. |
| 5,676,834 A | * | 10/1997 | Kuntz |

FOREIGN PATENT DOCUMENTS

| | | |
|---|---|---|
| DE | 25 02 371 A | 7/1976 |
| SU | 628 940 | 9/1978 |

* cited by examiner

*Primary Examiner*—Ana Fortuna
(74) *Attorney, Agent, or Firm*—Oliff & Berridge, PLC

(57) ABSTRACT

Disclosed is a process for the resolution of a mixture into at least one first fraction and one second fraction, the respective compositions of said fractions differing by at least one element. The process further comprises at least one elementary stage of fractionation, in which at least two inflows are placed in contact, these two flows being a first inflow (10) with low first fraction content, notably in counter-current, and a second inflow (11) with low second fraction content. Two outflows are obtained, said flows being a first outflow (12) enriched in first fraction with respect to the first inflow (10), and a second outflow (13) enriched in second fraction with respect to the second inflow (11). According to the invention, the elementary fractionation stage, which is non-static, is implemented in an elementary fractionation run, at which point at least one mass exchange buffer supply (15) is accumulated, and the elementary stage of fractionation is periodically initiated and repeated.

7 Claims, 6 Drawing Sheets

PROCESS AND APPARATUS FOR A MIXTURE RESOLUTION

The invention relates to the resolution of a mixture into at least a first fraction and a second fraction, these fractions differing from each other by their respective contents or compositions of at least one element or constituent, it being possible for the latter to be at least partially separated using any suitable separating technique employed during the resolution of the said mixture.

Many chemical engineering operations, such as distillation, liquid-liquid extraction, filtration or methodical washing of solids, require the presence of a counterflow or of a reflux. This counterflow, often indispensable to the operation, is generally obtained by gravity, using the difference in density of the separate phases, when such a difference exists and is large enough.

When the physical means capable of creating a reflux or a counterflow are absent or insufficient, as is the case with separations in a homogeneous phase or, in a heterogeneous phase, when the difference in density of the phases is not large enough, it becomes necessary to make use of other means.

Thus, in order to separate gas phases or fractions by gas diffusion, a reflux must be provided at each stage by extraction of a portion of the flows, followed by compression of that portion and its reinjection into the separating device.

Likewise, for operations involving at least one liquid phase or fraction and at least one solid phase or fraction, it is necessary to employ a succession of operations, such as filtration or centrifuging, removal of the cake, putting the latter back into suspension, pumping and, finally, reintroduction into the filtration.

The various means that should then be employed are often complex to run and expensive in terms of equipment and control means; they also involve considerable running and maintenance labor costs and a high energy cost. These means also have a negative impact on the reliability of the device for resolving the mixture or mixtures treated.

Document U.S. Pat. No. 2,609,277 relates to a column for liquid/liquid and gas/liquid contact, which may comprise porous or perforated walls, or else poppets, but not both. The passage of fluid from one stage to another is therefore controlled by the poppets, but there is no simultaneous enrichment or depletion operation.

In the pulsed apparatus described by document U.S. Pat. No. 4,133,714, intended for gas/solid/liquid exchanges, the stages are separated by a perforated wall which has an opening. However, no moveable shutter is employed. During the pulses, the liquid enters a stage freely and leaves a stage freely.

Document DE-A-25 02 371 describes conventional columns for pulsed liquid/liquid exchanges. The perforated walls separating the stages comprise openings or filters, but not both. The pistons employed never leave the corresponding cylinders, through the said cylinders.

Document SU-A-628,940 describes an apparatus for solid/liquid extraction. The pulsating stages are separated by perforated trays which partly retain the solids, without filters being involved.

The present invention aims to remedy all or some of these various drawbacks by combining the members or means providing and [sic] the separating functions with those providing the recycling or reflex functions.

By recycling, it should be understood to mean here any return of at least one flow towards or into a vessel for resolving a mixture, including the creation of a reflux or of a counterflow.

According to FIG. 1, a resolution process according to the invention makes it possible to resolve a mixture into at least a first fraction and a second fraction, these fractions differing from each other by their respective compositions of at least one element. This process comprises a plurality of elementary fractionation steps, in which steps at least two inflows, namely a first inflow (10) depleted in the first fraction and a second inflow (11) depleted in the second fraction are brought into contact with each other in order to obtain two outflows, namely a first outflow (12) enriched in the first fraction compared with the first inflow (10) and a second outflow (13) enriched in the second fraction compared with the second inflow (11), each elementary, non-stationary, fractionation step being carried out in an elementary fractionation stage (14), at which stage a mass-exchange buffer volume (15) is accumulated and each elementary fractionation step initiated and repeated periodically comprising at least the following phases:

a) depletion (4) in the first fraction, using a separating technique chosen from the group consisting of filtration, gas diffusion, ultrafiltration and reverse osmosis, of a first flow (16) relatively rich in the said first fraction, in order to obtain the first inflow (10), b) introduction and mixing of the first inflow (10) in the buffer volume (15); then introduction and mixing of the second inflow (11) in the buffer volume (15), c) extraction of the first outflow (12) from the buffer volume (15); then extraction of the second outflow (13) from the buffer volume, the depletion (4) in the first fraction of the first flow being carried out concomitantly with the introduction of the first inflow (10), the introduction of the first inflow (10) being carried out concomitantly with the extraction of the first outflow (12), the introduction of the second inflow (11) being carried out concomitantly with the extraction of the second outflow (13), the extraction of the second outflow (13) being interrupted, during the introduction of the first inflow (10), and the introduction of the first inflow (10) being interrupted during the extraction of the second outflow (13), the introduction of the second inflow (11) being interrupted during the extraction of the first outflow (12), and the extraction of the first outflow (12) being interrupted during the introduction of the second inflow (11).

The present invention also includes the following methods of implementation:

the physical state of the buffer volume 15 is suitable for a mass exchange in a homogeneous or heterogeneous phase, this exchange being chosen from liquid/liquid, liquid/gas, liquid/solid, gas/solid, gas/gas and gas/liquid/solid exchanges;

as described in relation to the operating device in FIGS. 2 to 7, at least one of the following phases, namely introduction of the first inflow 10, introduction of the second inflow 11, extraction of the first outflow 12 and extraction of the second outflow 13, is initiated by acting on a pressure differential existing on either side of the fractionation stage 14, at least one of the phases described in the previous paragraph is controlled depending on the first-fraction and/or second-fraction composition of the buffer volume;

turbulence is created in this buffer volume in each fractionation stage.

To conclude, a process according to the invention may comprise several elementary fractionation steps, as defined above, these being carried out methodically in respectively several successive elementary fractionation stages, by means of which, starting from one or more mixtures, at least a first outgoing stream, enriched in the first fraction, and a second outgoing stream, enriched in the second fraction, are obtained. These elementary fractionation steps are repeated in an identical manner, with the same period, from one fractionation stage to another.

A device allowing the process defined above to be implemented in accordance with the appended FIGS. 2 to 7 is described by way of non-limiting example. This device is characterized in that it comprises a wall ($P_1$) defining, on either side, two spaces ($E_1$, $E_2$) in which, in operation, different pressures ($Pr_1$, $Pr_2$) obtained, the said device including:

a) at least one orifice (2) provided with a shutter (3) and b) at least one separating member (4) provided, if required with a shutter (5), and in that the orifice (2), its shutter (3), the separating member (4) and, if required, the shutter (5) are arranged and/or designed in such a way that a flow of material passes through the orifice(s) (2) when $Pr_1$ is greater than $Pr_2$, and the separating member(s) (4) when $Pr_2$ is greater than $Pr_1$.

According to one particular embodiment, the shutter (3) and the separating member (4) provided if required with the shutter (5) are joined together as a single mechanical component, as shown in the appended FIG. 3.

According to another embodiment, the separating member (4) forms part of the wall ($P_1$), the shutter (5) being omitted, as shown in the appended FIG. 4.

The subject of the present invention is also a vessel provided with feed and discharge members, characterized in that:

a) it contains a plurality (N) of devices as defined above, which are identical to each other or are different, the walls ($P_1$ to $P_N$) of which define a number (N+1) of spaces ($E_1$ to $E_{N+1}$), which are geometrically identical or different and in which, in operation, different pressures $Pr_x$ and $Pr_{x+1}$ obtain, respectively, on either side of a wall ($P_x$) of a stage X, b) each stage formed from a wall ($P_x$) provided with at least one orifice (2), with its shutter (3), with at least one separating member (4) and, if required, with its shutter (5) is arranged and/or designed in such a way that a flow of material passes through the orifice(s) (2) when ($Pr_x$) is greater than ($Pr_{x+1}$), and the separating member(s) (4) when ($Pr_{x+1}$) is greater than $Pr_x$, c) the stack of stages is arranged and/or designed in such a way that all or part of the said flow of material passes through the stack.

The device according to the invention comprises, as indicated above and especially shown in FIG. 2, a wall ($P_1$) which includes at least one separating member (4).

This member is chosen, depending on the separating technique adopted, from, in particular, filters, gas diffusion barriers and adsorption, absorption, ultrafiltration and reverse osmosis members, these being known to those skilled in the art and intended for modifying the composition of the media passing through them.

These separating members (4) may be provided with shutters (5). Of course, the shutters (3) and, when they are present, the shutters (5) are moveable.

Other advantageous variants and/or characteristics that the device according to the invention may have will appear on reading the text which follows.

The subject of the invention is also a vessel containing a plurality of such devices. Such a vessel (D) is shown schematically in the appended FIG. 5.

A number (N) of elements (Px), which are not necessarily dimensionally identical, defining (N+1) spaces (E) which are not necessarily equal, are arranged in the vessel (D) provided, apart from its usual draining, safety, control or inspection devices, not shown, with various feed ($V_x$) and discharge ($V_A$, $V_B$) devices.

According to one particularly advantageous mode of operation, the medium to be treated introduced into the vessel is subjected, by any suitable means for generating, electrically, mechanically, externally or internally, alternating pressure pulses, to pulsed injections of the flows to be treated and to pulsed extractions of the products obtained.

For each device, according to FIG. 2, when the pressure $Pr_2$ is greater than the pressure $Pr_1$ the shutters (5), if they are present, are put, spontaneously under the effect of the pressure difference, into the open position; at the same time, in a similar manner, the shutters (3) are closed. Due to the effect of the pressure difference, the medium contained in the space ($E_2$) is directed towards the space ($E_1$) through the separating elements (4) and undergoes, completely or partly, the desired enrichments or depletions.

When the half-period of the pressure pulses causes the pressure $Pr_1$ to become greater than the pressure $Pr_2$, the shutters (3) are open and the shutters (5), if they are present, are closed. Under the effect of the pressure difference, the medium contained in the space ($E_1$) passes into the space ($E_2$) through the orifices (2), thus forming the desired reflux, recycling or counterflow.

The member for generating the alternating pulses reverses again the pressure difference [lacuna] $Pr_1$ and $Pr_2$ and, consequently, the directions of the flows passing through the separating element.

The periodic repetition of the pulses, the period and amplitude of which depend, like the number and dimensional characteristics of the devices or vessels according to the invention, on the composition and on the throughputs of the media to be treated, makes it possible, when applied to all of the separating elements of the vessel (D), to obtain a reflux or counterflow effect similar to that usually obtained by other means, especially in distillation columns, liquid/liquid extraction columns or systems for the methodical washing/extraction of solids.

According to one particular embodiment, the opening of the shutters (3) may, when the pressure $Pr_1$ becomes greater than the pressure $Pr_2$, be retarded by any suitable member such as, in particular, the external control and the use of spring-loaded poppets, so as to cause a partial flow in the opposite direction through the separating members (4), facilitating, depending on the use, the declogging, regeneration or desorption operations and tending to maintain, prolong or restore the separating properties of the means used for this purpose.

According to another particular embodiment not illustrated, the spaces lying between the separating elements may be provided with turbulators or pulsators, these being active or passive, by the effect of pressure pulses, so as, in particular in the case of the treatment of compressible media, to create the pulses needed for proper implementation of the process according to the invention, or to remedy their attenuation resulting from any loss of head suffered by the actions or flows when by-passing the separating means.

According to an alternative embodiment, suitable for the treatment of gases, FIG. 6 shows a vessel more particularly intended for separating gases from air.

A vessel (D) of approximately circular cross section contains (N) largely planar devices according to the invention ($P_1, P_2, \ldots, P_x, \ldots, P_{N-2}, P_{N-1}, P_N$), the number and characteristics of which may be determined in a manner known per se by a person skilled in the art, depending in particular on the operating pressures, throughputs and compositions, as well as on the performance characteristics of the gas diffusion modules (4) which do not include shutters.

The shutters (3) are poppets which return under their own weight.

The apparatus is provided with a mechanical pulse-generating member consisting of a plurality (N) of rigid plates ($A_1, A_2, \ldots, A_{N-1}, A_N$) which are identical or different, do not occupy the entire cross section [lacuna] (D), are located between the devices according to the invention and are connected together by a shaft (Z) passing through the said devices perpendicularly and in a substantially sealed manner.

The shaft/plates assembly is driven by a pneumatic motor (M) generating oscillatory movements, of controlled amplitude and controlled period or frequency, parallel to the axis (Z) of the vessel (D).

Each of the plates ($A_1, A_2, \ldots, A_{N-1}, A_N$) is therefore similar to an unsealed piston, driven alternately in the space separating two devices according to the invention.

Air admitted at constant pressure at ($V_1$) is fractionated in the apparatus into an oxygen-enriched outflow and an oxygen-depleted outflow which are collected at $V_2$ and $V_3$, respectively.

Of course, the control, analysis and safety means of the system are not shown.

According to another alternative embodiment, suitable for the treatment of solids by liquids, FIG. 7 shows a vessel more particularly intended for the methodical extraction of aromatic principles contained in a ground, plant-derived or woody substrate that does not settle in the extraction solvent chosen.

The vessel (D) contains (N) devices ($P_1, P_2, \ldots, P_{N-1}, P_N$) according to the invention, the number and the characteristics of which may be determined in a manner known per se by a person skilled in the art depending, in particular, on the operating throughputs and compositions, as well as on the performance characteristics of the filters (4) which do not include shutters.

The shutters (3) are poppets returned by prestressed springs so as to cause, when the flow tends to follow the orifices (2), a temporary counterflow through the filters (4), helping to unclog the said filters and to remove any accumulation of solids formed.

The upper part of the vessel (D) has a pocket (R) of inert gas maintained under pressure.

The virgin stock to be treated, consisting of ground plant matter with a suitable amount of solvent, is admitted at ($V_1$) under the device ($P_N$).

The solvent, depleted, fresh and/or regenerated, is admitted by periodic flow at ($V_2$) into the lower part of the vessel (D), while the exhausted stock, discharged at ($V_4$) into a tank not shown maintained at a pressure close to atmospheric pressure, is also extracted periodically. The feed at ($V_2$) and the discharge at ($V_4$) are alternating, so that alternating flows result in the vessel (D), these flowing through the stack of devices according to the invention that it contains and, consequently, into the desired effect of a succession of filtration and recycling steps.

The flow of solvent enriched in dissolved aromatic principles is extracted at ($V_3$), at the top of the vessel (D), in order to be treated in a regeneration system not shown where the aromatic principles initially contained in the virgin stock are collected.

Referring to the appended FIG. 8, a device similar to that described with reference to FIG. 7 will be described, this device making it possible to produce titanium dioxide by washing a suspension of metatitanic acid resulting from the hydrolysis of titanyl sulphate, as obtained in any conventional process for manufacturing titanium dioxide pigments from "slags".

The suspension of metatitanic acid is contained in a 200 liter drum 51 and homogenized by a slowly rotating propeller stirrer. This suspension is fed by a peristaltic pump into the tray 75 of a washing column 52, operating according to the process of the invention. The suspension thus fed is indicated in FIG. 8 by the letter "F".

The washed product is extracted from the bottom of the column 52, via a positive-displacement diaphragm pump $P_2$, into a drum 53 stirred with a slowly rotating propeller. The washed product is identified in FIG. 8 by the letter "P".

The washing water, identified by the letter "W", is introduced by a positive-displacement pump with a constant cycle but in phase opposition with the previous positive-displacement pump, and the swept volume of which is automatically adjusted depending on the resistivity of the buffer volume or medium at the tray 30 of the column 52.

The impregnation mother liquid, identified by the letter "D" in FIG. 8, slightly diluted with some of the washing water, is withdrawn by natural overflow from the top of the column 52.

The column 52 consists of a 160 mm diameter barrel made of steel and glass. The various trays, made of stiffened PVC are spaced apart with a spacing of 20 mm. Each tray has a unitary filtration area of the order of 100 cm$^2$, with an area of the order of 6 cm$^2$ closed off by a poppet. Filtration is obtained by a PTFE (polytetrafluoroethylene) cloth, for example. This filtration takes place in the ascending direction, while the poppets open in the descending direction.

The positive-displacement diaphragm pumps, with a variable stroke. have a swept volume of the order of 500 cm$^2$. The pump for demineralized water is controlled depending on the resistivity at the tray 30, as indicated above. Furthermore, the positive-displacement pump assigned to the washed product can be manually adjusted in phase opposition with the previous pump. It is this phase opposition of the pumps $P_1$ and $P_2$ which generates the alternating flows in the column 52.

The results obtained, after stabilizing for six hours, are shown in the table below. With a limited amount of washing water and without excessively diluting the impregnation liquid, in order to minimize the treatment of the effluents, a quality corresponding to three successive filtration/washing/repulping [lacuna] on conventional cartridge filters is obtained.

TABLE

| | FLOW | | | | | | | |
|---|---|---|---|---|---|---|---|---|
| | ⟨F⟩ FEED | | ⟨W⟩ SCRUBBING WATER | | ⟨D⟩ OVERFLOW | | ⟨P⟩ EXTRACTED PRODUCT | |
| CONSTITUENT | Kg/h | wt % | Kg/h | wt % | Kg/d | wt % | Kg/h | wt % |
| $TiO_3H_2$ ($TiO_2.H_2O$) | 44.2 | 18 | — | — | traces | — | 44.2 | 21.7 |
| $H_2SO_y$ | 51.9 | 21.2 | — | — | 51.7 | 24.3 | 0.2 | 0.1 |
| $FeSO_4$ | 0.4 | 0.2 | — | — | 0.4 | 0.2 | traces | — |
| $TiOSO_4$ | 1.5 | 0.6 | — | — | 1.5 | 0.7 | traces | — |
| $H_2O$ | 147.0 | 60 | 171.5 | 100 | 159.2 | 74.8 | 159.3 | 78.2 |
| TOTAL | 245 | 100 | 171.5 | 100 | 212.8 | 100 | 203.7 | 100 |

The applications of the invention lie within the following fields:

separation of gases:
  $U_{235}$ isotope enrichment of a gas flow, mixture of $U_{238}F_6$ [sic] and $U_{235}F_6$ [sic],
  separation of gases from air: oxygen, nitrogen, rare gases,
  separation of chemical molecules forming an azeotrope.

gas-solid contacts:
  chemical treatment or impregnation of low-density solid phases,
  heterogeneous catalysis with extraction— regeneration—recycling of catalyst,
  gas/solid reactions;

liquid/solid contacts:
  treatment of ores having a low bulk density,
  methodical washing of crystals,
  heterogeneous catalysis of chemical reactions with extraction—regeneration—recycling of catalyst,
  extraction of fragrances, pharmaceutical principles, purification of foodstuffs,
  dissolution of solids;

gas/liquid/solid contacts:
  gas-liquid chemical reactions in heterogeneous catalysis (hydrogenations, oxidations, alkylations, etc.);

liquid/liquid homogeneous separations:
  reverse osmosis, ion exchanges.

Furthermore, these applications are found in all types of industries.

BRIEF DESCRIPTION OF THE DRAWINGS

Various exemplary embodiments of this invention will be described in detail, with reference to the following figures, wherein.

Figure 1:
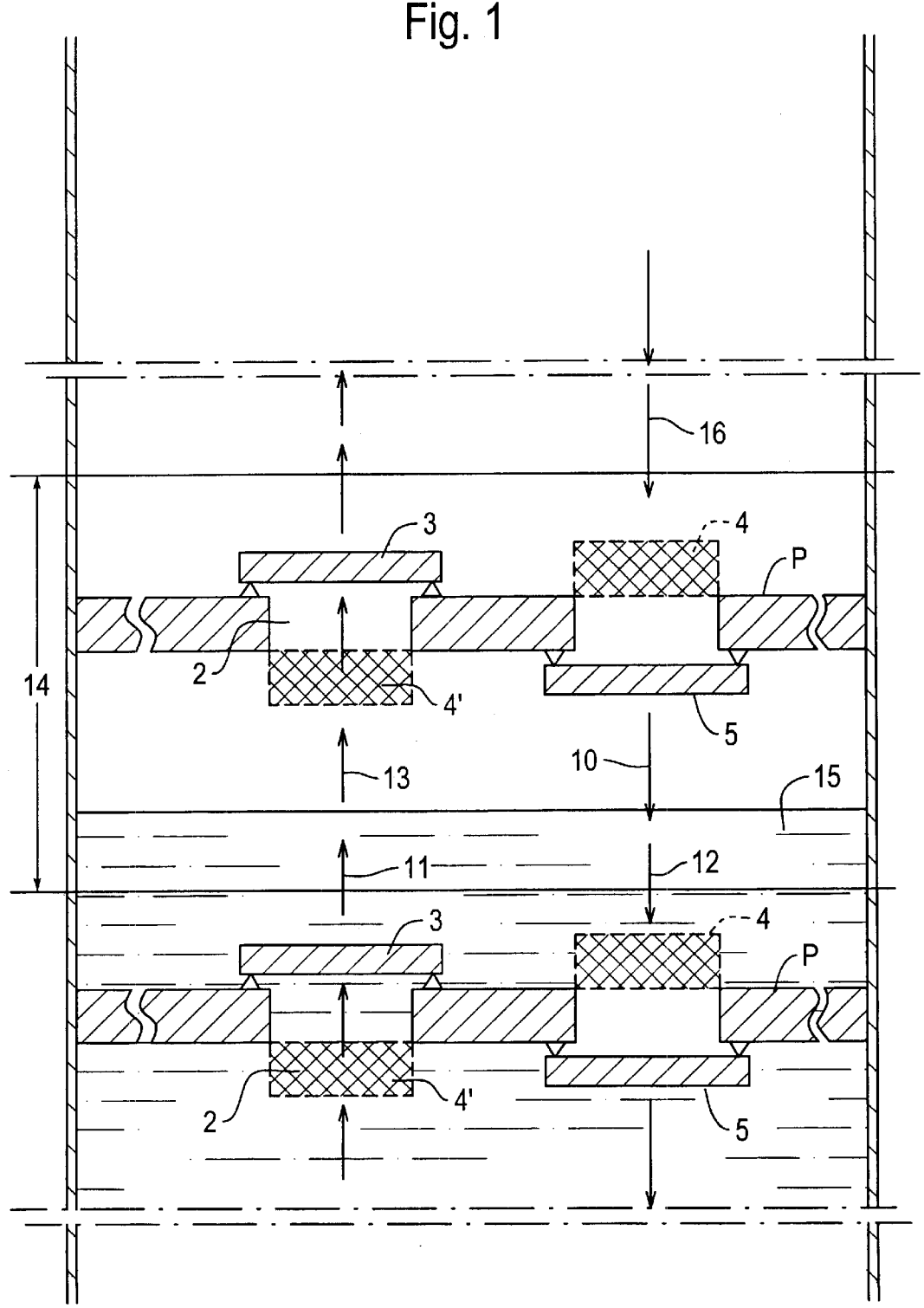
FIG. 1 is a flowchart outlining one exemplary embodiment of a resolution process according to the invention.
Figure 2:
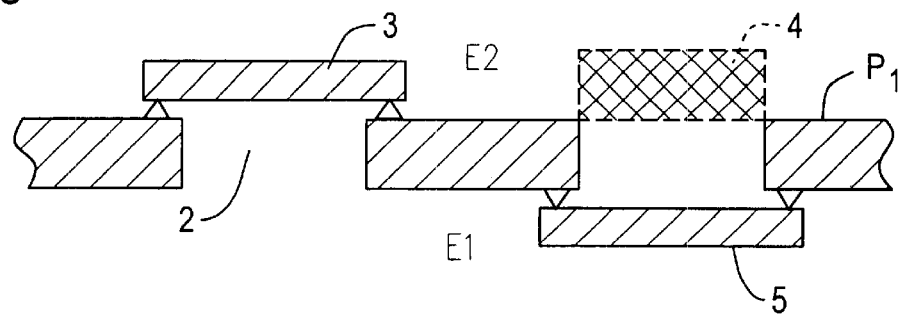
FIG. 2 is a diagram illustrating one exemplary embodiment of a device for implementing a resolution process according to the invention.
Figure 3:
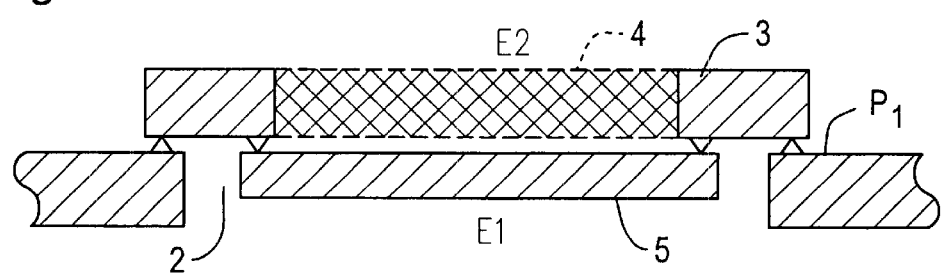
FIG. 3 is a diagram illustrating another exemplary embodiment of a device for implementing a resolution process according to the invention.
Figure 4:
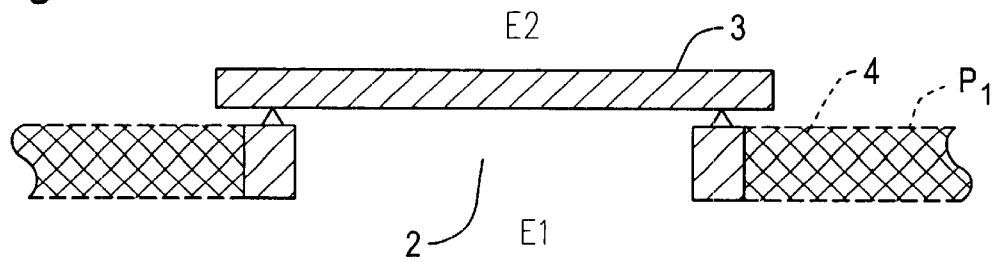
FIG. 4 is a diagram illustrating another exemplary embodiment of a device for implementing a resolution process according to the invention.
Figure 5:
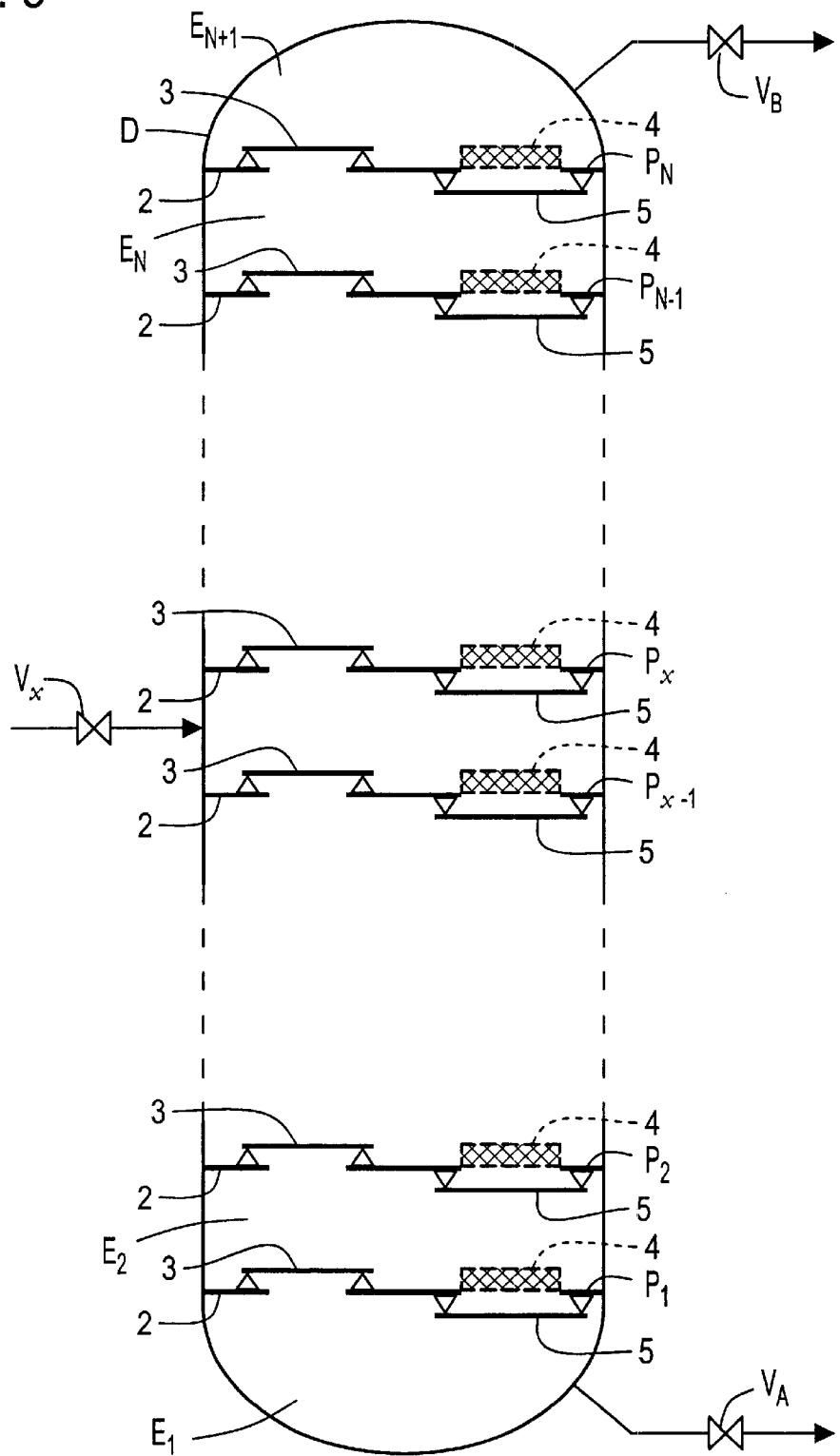
FIG. 5 is a diagram illustrating one exemplary embodiment containing a plurality of devices for implementing a resolution process according to the invention.
Figure 6:
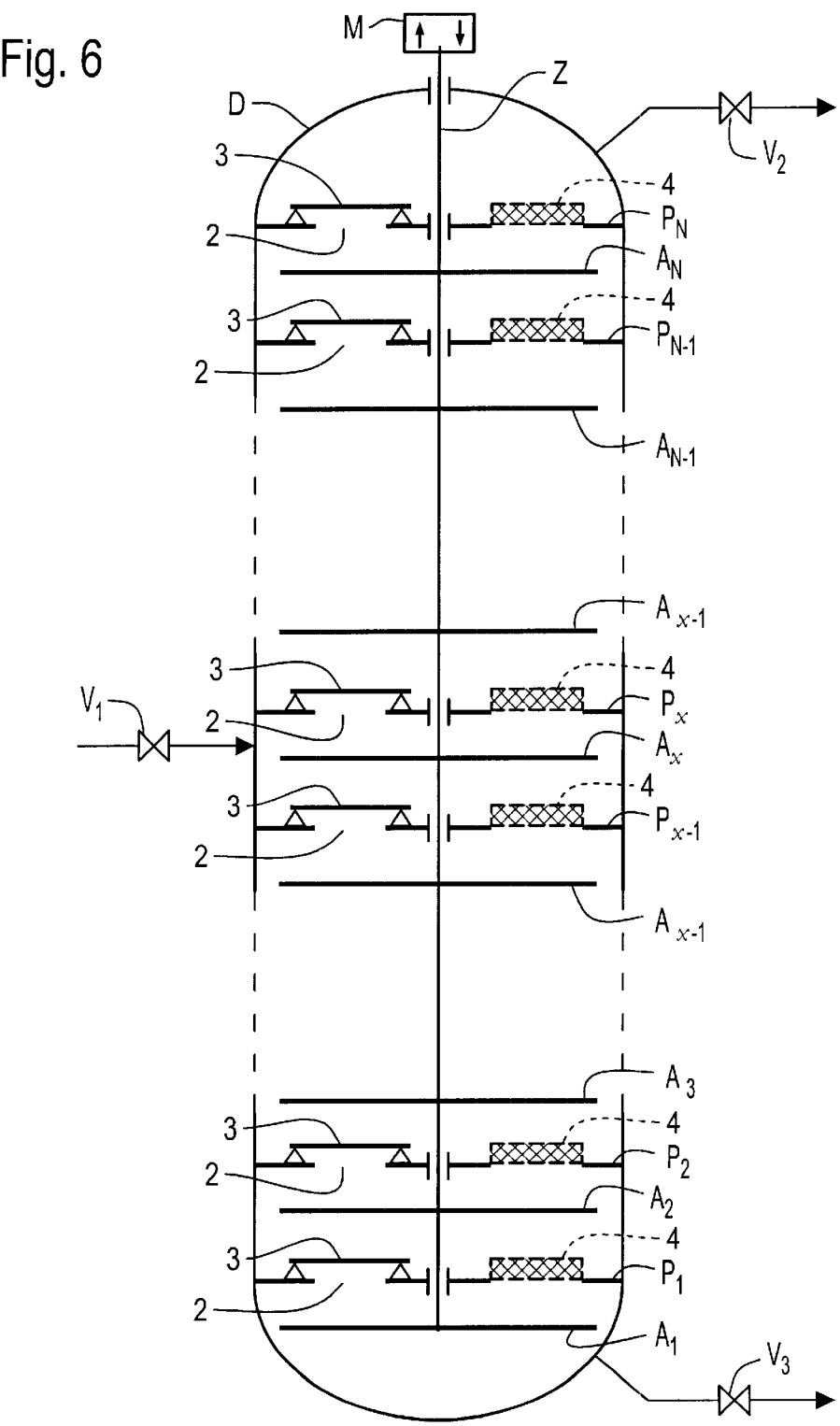
FIG. 6 is a diagram illustrating another exemplary embodiment containing a plurality of devices for implementing a resolution process according to the invention.
Figure 7:
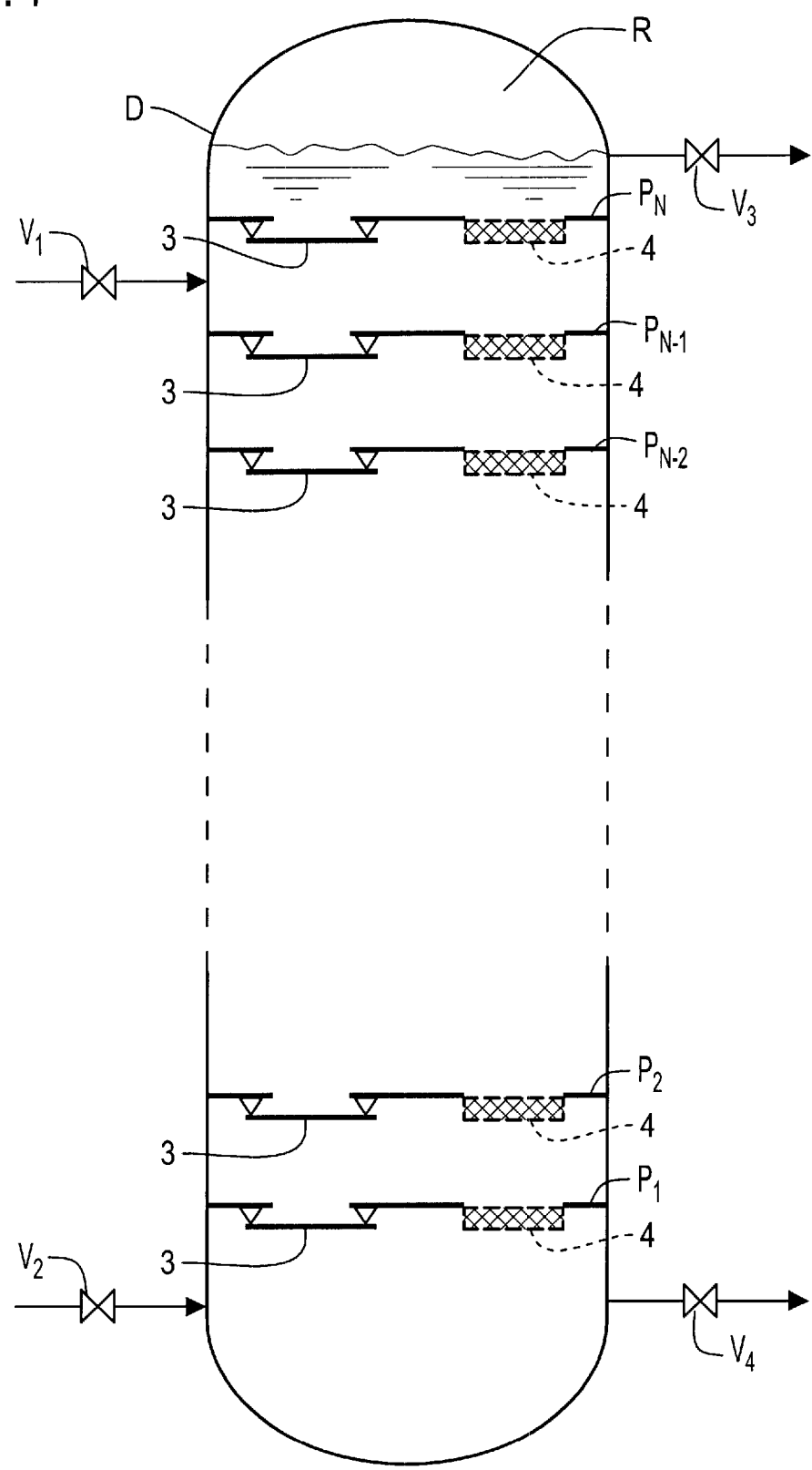
FIG. 7 is a diagram illustrating another exemplary embodiment containing a plurality of devices for implementing a resolution process according to the invention.
Figure 8:
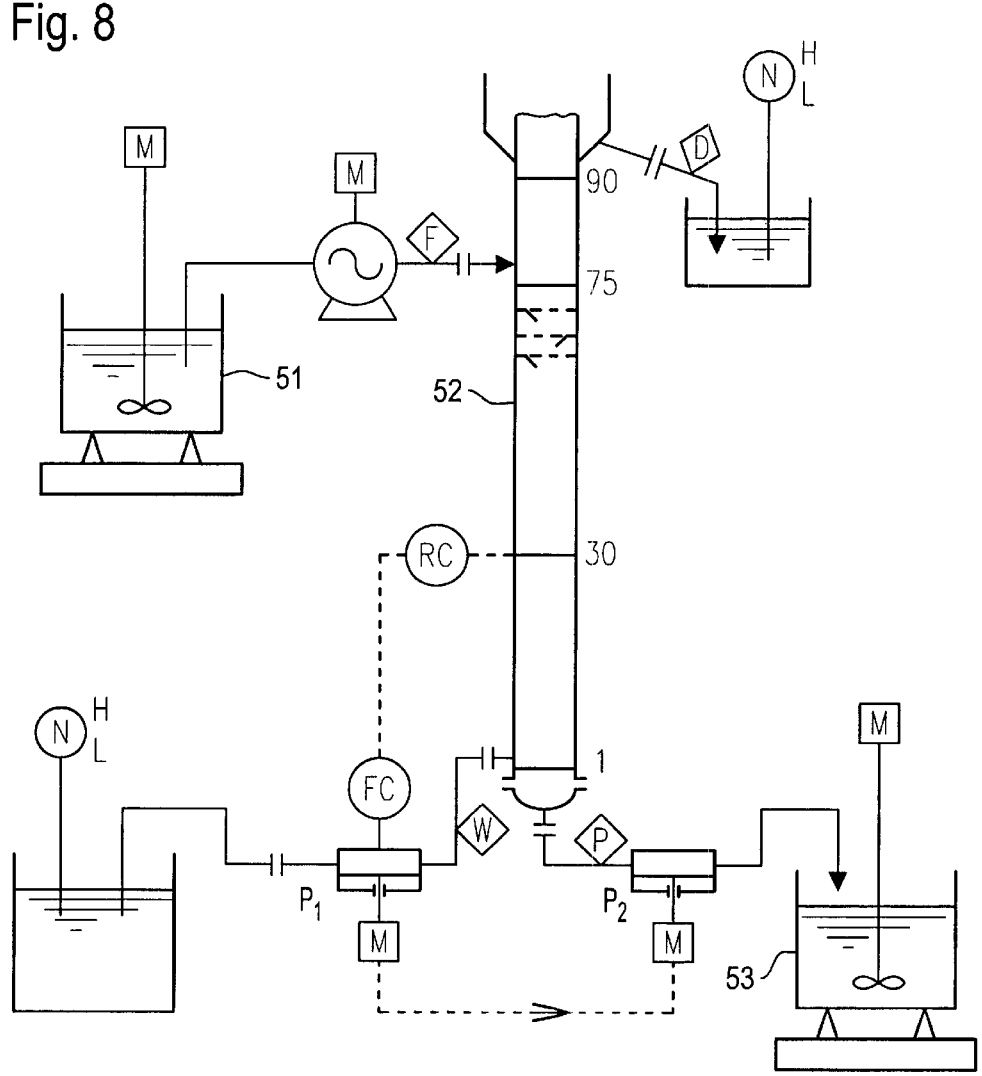
FIG. 8 is a diagram illustrating another exemplary embodiment containing a plurality of devices for implementing a resolution process according to the invention.

What is claimed is:

1. A process for resolving a mixture into at least a first fraction and a second fraction, the at least first and second fractions differing by their respective compositions of at least one element, the process comprising:
  providing a vessel comprising feed and discharge members, and a stack of separation stages;
  subjecting the mixture to a first elementary, non-stationary fractionation step, comprising:
    depleting the mixture of the first fraction, using a separation technique selected from the group consisting of filtration, gas diffusion, ultrafiltration and reverse osmosis, the depleted mixture being a first inflow to a mass exchange buffer volume;
    introducing and mixing a second inflow depleted in the second fraction, to the mass-exchange buffer volume;
    extracting a first outflow from the mass-exchange buffer volume concomitantly with the introduction of the first inflow; and
    extracting a second outflow from the mass-exchange buffer volume concomitantly with the introduction of the second inflow;
    wherein
      introducing the first inflow and extracting the second outflow are not carried out simultaneously; and
      introducing the second inflow and extracting the first outflow are not carried out simultaneously; and
  subjecting the mixture to at least one additional elementary, non-stationary fractionation step wherein the first inflow in each of the at least one additional fractionation steps is obtained by depleting the first outflow of the previous fractionation step using the separation technique.

2. The process of claim 1, wherein the mass-exchange buffer volume is suitable for a mass exchange in a homogeneous or heterogeneous phase, the mass exchange is selected from the group consisting of liquid/liquid, liquid/gas, liquid/solid, gas/solid, gas/gas and gas/liquid/solid exchanges.

3. The process of claim 1, wherein at least one of introducing the first inflow, introducing the second inflow, extracting the first outflow and extracting the second outflow, is initiated by acting on a pressure differential existing on either side of the fractionation stage.

4. The process of claim 1, wherein at least one of introducing the first inflow, introducing the second inflow, extracting the first outflow and extracting the second outflow, is controlled depending on at least one of the first-fraction and second-fraction composition of the mass-exchange buffer volume.

5. The process of claim 1, wherein turbulence is created in the mass-exchange buffer volume in each fractionation stage.

6. The process of claim 1, comprising several elementary fractionation steps, carried out in several successive elementary fractionation stages, whereby, starting from one or more mixtures, at least a first outgoing stream, enriched in the first fraction, and a second outgoing stream, enriched in the second fraction, are obtained.

7. The process of claim 1, wherein the elementary fractionation steps are repeated in an identical manner, depending on a period from one fractionation stage to another.

* * * * *